United States Patent
Kolotinsky et al.

(10) Patent No.: US 10,943,235 B2
(45) Date of Patent: Mar. 9, 2021

(54) SYSTEM AND METHOD OF SOFTWARE-IMITATED USER TRANSACTIONS USING MACHINE LEARNING

(71) Applicant: AO Kaspersky Lab, Moscow (RU)

(72) Inventors: Evgeny B. Kolotinsky, Moscow (RU); Vladimir A. Skvortsov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 60 days.

(21) Appl. No.: 15/978,348

(22) Filed: May 14, 2018

(65) Prior Publication Data

US 2018/0268410 A1    Sep. 20, 2018

Related U.S. Application Data

(62) Division of application No. 15/176,892, filed on Jun. 8, 2016, now Pat. No. 10,235,673.

(30) Foreign Application Priority Data

Feb. 18, 2016   (RU) ............................ RU2016105558

(51) Int. Cl.
*G06Q 40/00* (2012.01)
*G06Q 40/02* (2012.01)
(Continued)

(52) U.S. Cl.
CPC ......... *G06Q 20/4016* (2013.01); *G06F 3/033* (2013.01); *G06F 3/0484* (2013.01);
(Continued)

(58) Field of Classification Search
CPC ........ G06Q 10/10; G06Q 10/06; G06Q 40/00; G06Q 40/02; G06F 17/5022; G06F 17/5045; G06F 11/261
(Continued)

(56) References Cited

U.S. PATENT DOCUMENTS 7,630,968 B2 * 12/2009  McCammon ....... G06F 17/2785
8,230,232 B2    7/2012  Ahmed et al.
(Continued)

FOREIGN PATENT DOCUMENTS

CN         104301286 A    1/2015
EP           2922265 A1    9/2015
(Continued)

OTHER PUBLICATIONS

Hollmén, Jaakko. "Probabilistic approaches to fraud detection." Licentiate's Thesis, Helsinki University of Technology, Department of Computer Science and Engineering 15 (1999). (Year: 1999).*
(Continued)

*Primary Examiner* — Kelly S. Campen
(74) *Attorney, Agent, or Firm* — Arent Fox LLP; Michael Fainberg

(57) ABSTRACT

Systems and methods for detecting fraudulent activity in user transactions. An exemplary method includes, by a hardware processor, receiving user behavior data provided by an input device specifying a user interaction with graphical user interface (GUI) elements of a first application on a computing device for a transaction with a remote server, training a behavior classification algorithm using known behavior of the user, calculating an anomalous user behavior coefficient based on the user behavior data and the behavior classification algorithm, wherein the anomalous user behavior coefficient represents a likelihood that the user's interaction with the plurality of groups of elements of the graphical interface was fraudulent, detecting whether the user interaction is a software-imitated user interaction based on the anomalous user behavior coefficient, and responsive to detecting a software-imitated user interaction, blocking the transaction with the remote server.

18 Claims, 4 Drawing Sheets

(51) Int. Cl.

| | | |
|---|---|---|
| *G06Q 20/40* | (2012.01) | |
| *G06F 3/0488* | (2013.01) | |
| *G06F 3/033* | (2013.01) | |
| *G06F 21/31* | (2013.01) | |
| *G06F 21/55* | (2013.01) | |
| *G06F 3/0484* | (2013.01) | |
| *G06Q 20/10* | (2012.01) | |
| *H04L 29/06* | (2006.01) | |

(52) U.S. Cl.
CPC .......... *G06F 3/0488* (2013.01); *G06F 21/316* (2013.01); *G06F 21/552* (2013.01); *G06Q 20/1085* (2013.01); *G06Q 40/00* (2013.01); *G06Q 40/02* (2013.01); *H04L 63/1441* (2013.01); *H04L 63/1425* (2013.01)

(58) Field of Classification Search
USPC ............................................ 705/7.27, 35, 42
See application file for complete search history.

(56) References Cited

U.S. PATENT DOCUMENTS

| | | | | |
|---|---|---|---|---|
| 8,280,833 | B2* | 10/2012 | Miltonberger | G06Q 10/067 |
| | | | | 705/348 |
| 8,650,080 | B2* | 2/2014 | O'Connell | G06Q 30/06 |
| | | | | 705/14.47 |
| 8,862,526 | B2* | 10/2014 | Miltonberger | G06Q 10/067 |
| | | | | 706/15 |
| 9,218,232 | B2* | 12/2015 | Khalastchi | G06K 9/00496 |
| 9,471,873 | B1* | 10/2016 | Wu | G06N 5/04 |
| 2006/0200457 | A1* | 9/2006 | McCammon | G06F 17/2785 |
| 2007/0239604 | A1* | 10/2007 | O'Connell | G06Q 20/4016 |
| | | | | 705/50 |
| 2008/0288303 | A1 | 11/2008 | Gray et al. | |
| 2010/0094767 | A1* | 4/2010 | Miltonberger | G06Q 10/067 |
| | | | | 705/325 |
| 2010/0094768 | A1* | 4/2010 | Miltonberger | G06Q 10/067 |
| | | | | 705/325 |
| 2010/0094791 | A1* | 4/2010 | Miltonberger | G06Q 10/067 |
| | | | | 706/46 |
| 2012/0084206 | A1* | 4/2012 | Mehew | G06Q 40/00 |
| | | | | 705/44 |
| 2012/0204257 | A1 | 8/2012 | O'Connell et al. | |
| 2013/0133055 | A1 | 5/2013 | Ali et al. | |
| 2013/0275355 | A1* | 10/2013 | Miltonberger | G06Q 10/067 |
| | | | | 706/46 |
| 2014/0149806 | A1* | 5/2014 | Khalastchi | G06K 9/00496 |
| | | | | 714/49 |
| 2015/0026027 | A1* | 1/2015 | Priess | G06Q 40/00 |
| | | | | 705/35 |
| 2016/0012230 | A1 | 1/2016 | Hanai et al. | |
| 2016/0261621 | A1* | 9/2016 | Srivastava | H04L 63/1466 |

FOREIGN PATENT DOCUMENTS

| | | | | |
|---|---|---|---|---|
| JP | 06259571 A | | 9/1994 | |
| KR | 20090009834 A | * | 1/2009 | ......... G06F 16/2438 |

OTHER PUBLICATIONS

Olszewski, Dominik. "A probabilistic approach to fraud detection in telecommunications." Knowledge-Based Systems 26 (2012): 246-258. (Year: 2000).*

Ninghui, Li, "Security Analytics Topic 5: probabilistic Classification Models: Naïve Bayes" https://www.cs.purdue.edu/homes/ninghui/courses/Fall17/handouts/05_classification.pdf. (Year: 2017).*

"Park et al. Anomaly Intrusion Detection by Clustering Transactional Audit Streams in a Host Computer" 2010 Information Sciences 180 2375-2389 (Year 2010).

* cited by examiner

SYSTEM AND METHOD OF SOFTWARE-IMITATED USER TRANSACTIONS USING MACHINE LEARNING

CROSS-REFERENCE TO RELATED APPLICATIONS

This application is a divisional application of U.S. application Ser. No. 15/176,892, filed Jun. 8, 2016, which claims benefit of priority under 35 U.S.C. 119(a)-(d) to Russian Federation Application No. 2016105558, filed on Feb. 18, 2016, both the contents of which are incorporated by reference herein.

FIELD OF TECHNOLOGY

The present disclosure relates generally to the field of computer security and, specifically, to systems and methods of detecting fraudulent user transactions.

BACKGROUND

Various computing devices (e.g., computers, tablets, notebooks, smartphones, etc.) are increasingly being used by people looking to simplify daily tasks: to read newspapers, to communicate by email or instant messaging services, to make purchases on the Internet, etc. One of the important areas of use of computing devices is the remote management of funds or online banking. Remote management of funds is a very convenient method of transferring funds from one bank account to another, but this method of management of funds may not be very safe—in a world where every computing device having access to the Internet can be attacked by a criminal, the funds of a person who uses the aforementioned computing device to manage his/her funds are also subject to danger.

In order to protect the user from the actions of criminals (who steal the account record for management of funds by using, for example, malicious software, such as key trackers), banks typically employ multifactor authentication techniques, which makes it possible to lower the likelihood that someone other than the owner of the bank account will have access to the funds. When multifactor authentication is used, the user should typically employ several methods of confirming his or her identity in order to receive service (for example, a user should be required to enter the login and password of the corresponding account record, as well as a onetime password which is provided via an SMS message). However, situations are possible where criminals have access to all of the devices being used for the multifactor authentication. Therefore, other methods of providing security are needed to ensure the safety of the user and his or her funds.

SUMMARY

The present invention provides a more effective solution to the problem of detecting anomalies in the behavior of a user when interacting with a remote bank server. One of the technical results of the present invention consists of protecting a remote bank server against fraudulent activity in user transactions, which is accomplished by blocking the interaction of the user's device with the remote bank server if fraudulent activity has been detected during the interaction of the user's computing device with the remote bank server.

An exemplary method for detecting fraudulent activity in user transactions comprises: collecting user behavior data during user's interaction via an input device with one or more groups of elements of a graphical interface of an application on a computing device; calculating, by a processor, an anomalous user behavior coefficient for each group of elements of the graphical interface based on the collected user behavior data; detecting, by the processor, a fraudulent activity when a combination of anomalous user behavior coefficients exceeds a predetermined threshold value; and in response to detecting a fraudulent activity, blocking, by the processor, the interaction of the user with the application.

In one exemplary aspect, the user's interaction with one or more groups of elements involves the user performing a financial transaction via one of a banking application, banking website, or an automated teller machine.

In one exemplary aspect, collecting user behavior further includes: performing depersonalization of the collected user data by generating a hashsum of the data.

In one exemplary aspect, calculating an anomalous user behavior coefficient includes training a behavior classification algorithm using know behavior of the user.

In one exemplary aspect, the anomalous user behavior coefficient is a numerical value calculated by applying simple probabilistic classifier to the collected user behavior data.

In one exemplary aspect, calculating a combination of anomalous user behavior coefficients includes one or more of: calculating the number of times the users access a group of elements of the graphical interface; calculating the number of groups of elements of the graphical interface by interacting with which the user can obtain access to another group of elements of the graphical interface; and calculating the number of elementary actions of the user needed to complete a transaction. An elementary action includes one or more of a moving a mouse cursor, pressing a key of an input device, moving of a user's finger or a stylus across the screen of the computing device without lifting off from the screen surface, touching of a user's finger or the stylus to the screen of the computing device; and calculating the number of known cases of fraudulent activity carried out on behalf of the user in an established period of time.

In one exemplary aspect, in response to detecting a fraudulent activity, the method includes classifying the application performing the fraudulent activity as malicious.

An exemplary system for detecting fraudulent activity in user transactions comprises a processor configured to: collect user behavior data during user's interaction via an input device with one or more groups of elements of a graphical interface of an application on a computing device; calculate an anomalous user behavior coefficient for each group of elements of the graphical interface based on the collected user behavior data; detect a fraudulent activity when a combination of anomalous user behavior coefficients exceeds a predetermined threshold value; and in response to detecting a fraudulent activity, block the interaction of the user with the application.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
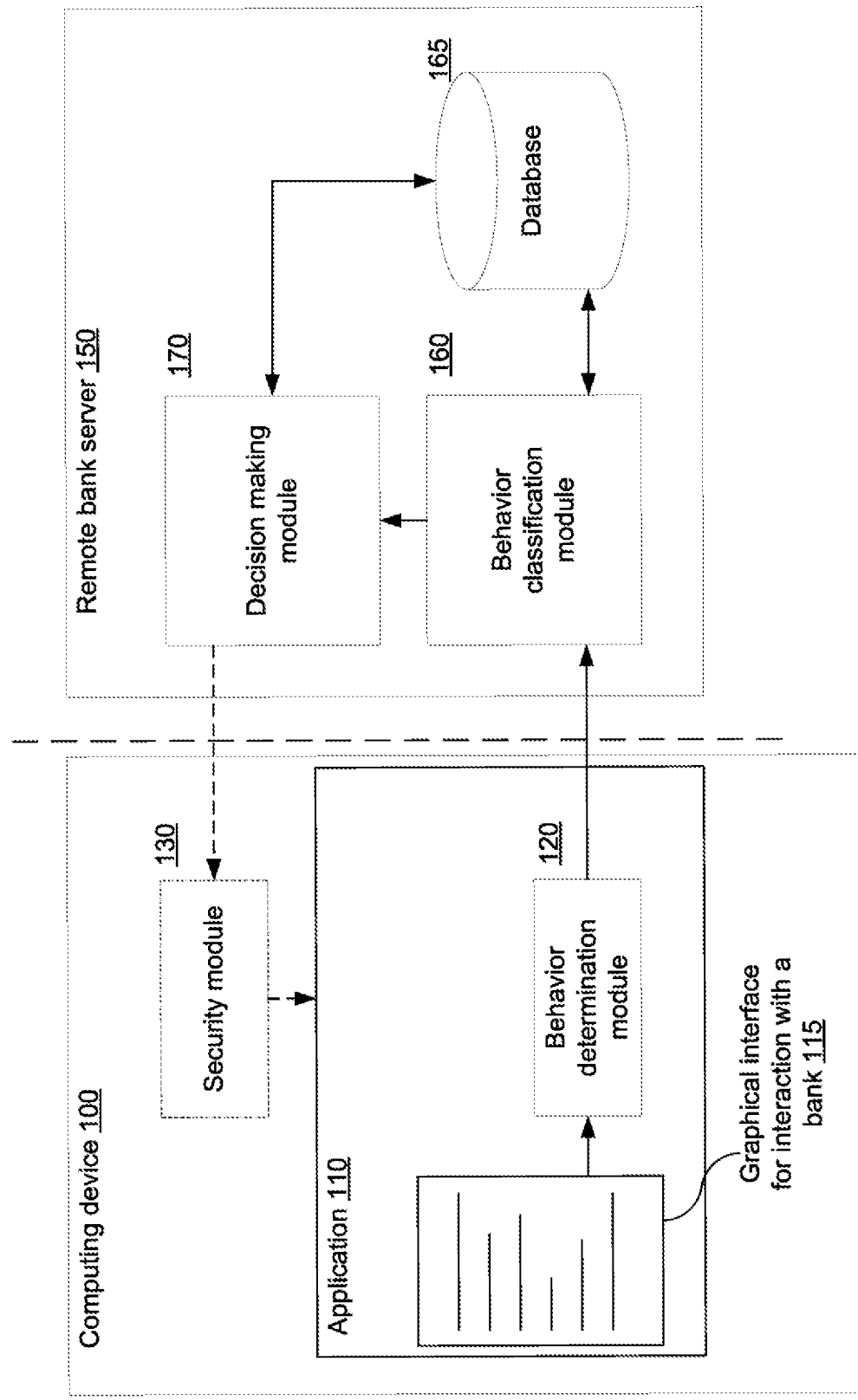
FIG. 1 illustrates a diagram of an exemplary system for detecting fraudulent user transactions.

Example aspects are described herein in the context of a system, method, and computer program product for detecting fraudulent activity in user transactions. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The disclosure herein provides a number of definitions and concepts that are employed to facilitate the explanation of the variant aspects. It should be appreciated that the following definitions are provided for purposes of the exemplary aspects.

A malicious application is an application (software) which is able to inflict harm on a computer or the user of a computer, for example, an Internet worm, a key tracker, or a computer virus. The harm inflicted might be unlawful access to the computer's resources, including data stored on the computer, for the purpose of theft, and also unlawful use of the resources, including for data storage, performing calculations, and so on.

User behavior data is information which is obtained by at least the input devices of the computing device. This information may include data related to the use of the input devices of the computing device: the key strokes, the coordinates of pressing the touchscreen, the trajectories of movement of the finger/stylus over the touchscreen, and others. In the general case, this information describes how and under which circumstances the computing device is used by the user.

The anomalous user behavior coefficient is a numerical value representing how anomalous or uncharacteristic user behavior, data about which has been gathered and used to calculate this coefficient, is for the aforesaid user (i.e., the larger the value, the less characteristic the behavior). In one example, the naive Bayes classifier may be used to calculate the anomaly coefficient, as applied to data on the behavior of the user during an interaction with a group of elements of the graphical interface.

An elementary action is an action of the user of a device which the user can perform in regards to a computing device. An elementary action may include, but is not limited to: a movement of the mouse pointer, a pressing of a key of an input device, a movement of a person's finger or a stylus over the screen of the computing device without lifting off from the screen surface, a touching of a person's finger or a stylus on the screen of the computing device.

Fraudulent activity is an interaction with a remote bank server which is performed with the use of a user's device or of an account record belonging to the user in order to perform said action, and unbeknownst to the user. Said interaction may be performed with the help of an application. Information about known cases of fraudulent activity may be stored in a database on a remote bank server, for example the date of a case of fraudulent activity and an indication of whether it is indeed fraudulent activity (and not a false positive). Such information can be added to the database by a bank employee in possession of the corresponding information.

One purpose of the interaction with a remote bank server maybe to perform a transaction with the participation of the remote server. Another purpose of the interaction with a remote bank server may be any other operation related to a financial product (such as obtaining information on the funds present in a particular bank account). The interaction can be done either by the user or by a third party in the name of the user, for example, via the user's device or an account record belonging to the user to perform the aforementioned interaction, and without the user's knowledge. It should be understood that whosoever interacts with a remote bank server, the interaction is done using a particular computing device. The person (user) interacts with a remote bank server by means of an application (the types and features of which will be disclosed later on), which is installed on the user's computing device.

FIG. 1 shows a block diagram of an exemplary system for detecting fraudulent user transactions with the remote bank server via a user's computing device. The computing device 100 is used by the user for interaction with the remote bank server 150. The computing device 100 can be a computer, a notebook, a smartphone, a tablet or any other device with a processor and random access memory (such as the Smart Watch wristwatch). A detailed diagram of an exemplary computing device is presented in FIG. 4. The remote bank server 150 includes a group of hardware and software components for realizing an interaction with the user's device 100 in order to manage the user's funds. In one aspect, the bank server 150 is an identical computing device to the computing device 100. In another aspect, the server 150 is a group of computing devices on which resources making up the remote bank server 150 are arranged. In one exemplary aspect, the remote bank server 150 belongs to the bank (a legal entity carrying out activity in the realm of finance). Using the computing device 100 the user may interact with the remote bank server 150, for example, to manage or transfer funds, check account balance, etc. It should be understood that the device 100 can also be used by a criminal. In such a case, the interaction with the server 150 will be performed the same as if by the user. Formally, in such a case, the interaction with the remote bank server is also executed by the user unless the contrary is proven (for example, if fraudulent activity is detected).

For the interaction with a remote bank server 150 the user of the computing device 100 uses an application 110, which may be: an Internet browser, by means of which the user obtains access to the web client of the remote bank server 150; or an application which has been developed for the hardware platform of the computing device 100 (a native application), for example, on order from the bank, in one exemplary aspect such an application is an application for different families of operating systems (OS): Android, iOS, Windows, Unix, etc.

The application 110 presents to the user a set of elements of a graphical interface 115 of the application for interaction with a remote bank server 150. In one exemplary aspect, such elements of the graphical interface 115 of the application can be: a button, an input field, a field for display of information (including text and graphics), a checkbox interface element, a scroll bar, and also any other elements of the graphical interface by means of which the interaction of the user (via the device 100) and the remote bank server 150 occurs. In one exemplary aspect, for access to the content being displayed in the application 110, the user should pass an authentication, which is needed by the remote bank server 150 to verify the identity of the user of the device 100. In one exemplary aspect, the authentication of the user of the device 100 may be performed using account name and password, which are verified by the server 150. In another aspect, the authentication of the user may be done based on the device authentication, in which case it is assumed that only the owner of the device can use the device 100.

In one exemplary aspect, application 110 includes a behavior determination module 120 configured to gather data on the behavior of the user during the interaction of the user with the elements of the graphical interface 115. The module 120 is further configured to group together elements of the graphical interface and gathers data on the interaction of the user with the elements of the graphical interface making up said group. Interaction with the elements of the graphical interface includes at least: data input via the element of the graphical interface (pressing a button or entering data in a text field), moving a cursor (movement of a finger/stylus) over the area of screen where said element is displayed. An example of the result of such a grouping may be a group consisting of only a text input field, a group consisting of a text input field and a button, or a group including the full set of graphical elements displayed to the user by means of the application 110 (for example, a set of graphical elements of the interface 115 of a window of the application 110, or a set of elements of the graphical interface 115 of a web page displayed to the user if the application 110 is a web browser). In one exemplary aspect, the module 120 may be realized as a component of the web page being displayed by the application 110 to the user—for example, as a script in JavaScript language (such a realization is characteristic of a situation where the application 110 is a web browser). In yet another exemplary aspect, the module 120 may be realized as an application library and be provided by the bank along with the application 110. In one exemplary aspect, the collection of data on the behavior of the user may be done by the calling up of corresponding system API functions (for example, "GetCursorPosition" for the Windows OS) or from corresponding event handlers (for example, "onTouch" for the OS Android).

The data on the behavior of the user constitutes information which is provided to the device 100 (and, accordingly, to the application 110) by means of the input devices. The volume of such information may differ depending on the hardware and software of the device 100, for example, the type of device (for example, a smartphone or notebook), the OS family of the device 100, and also the type of application 110 (whether a web browser or not).

In one exemplary aspect, the data on the behavior of the user includes information being provided by a "mouse" type manipulator, such as the coordinates of the cursor (e.g., relative to the screen of the device 100); and the coordinates of pressing/releasing of buttons.

In another exemplary aspect, the data on the behavior of the user includes information being provided by a keyboard of the device 100 (including the keyboard displayed on the touchscreen of the device 100), such as the keyboard character corresponding to the key pressed; and a sequence of two or three keys pressed.

In yet another exemplary aspect, the data on the behavior of the user includes information being provided by the touchscreen of the device 100, such as the coordinates of the point of pressing/releasing the screen; and the force of pressing the screen.

In yet another exemplary aspect, the data on the behavior of the user includes information provided by the microphone of the device 100, such as a recording of sounds in digital format.

In yet another exemplary aspect, the data on the behavior of the user includes information provided by an illumination sensor of the device 100, such as information on the presence and strength of light sources near the sensor.

In yet another exemplary aspect, the data on the behavior of the user includes information provided by a photographic/video camera of the device 100, such as photographs taken by the camera; and a video clip recorded by the camera.

In yet another exemplary aspect, the data on the behavior of the user includes information provided by an accelerometer of the device 100, such as information on the change in position of the device in space.

In one exemplary aspect, in addition to the above-described information the behavior determination module 120 additionally gathers information on the time of each of the abovementioned events (a time stamp for each of the above-described events—movement of the cursor, pressing the screen). In one exemplary aspect, if the application 110 is a web browser, the capabilities of collecting data on behavior by the module 120 may be limited by the capabilities provided by JavaScript (if the script is written in JavaScript language). In one exemplary aspect, given such limitations, the module 120 gathers data on behavior, said data including information provided by a "mouse" type manipulator, the keyboard of the device 100, and also the touchscreen of the device 100. In another exemplary aspect, if the application 110 is not a web client, the behavior determination module 120 gathers data on behavior. Access to this data is provided by the OS resources of the computing device 100.

In a general case, the volume of behavior data gathered will depend on the software and hardware of the device 100.

In one exemplary aspect, the user's computing device 100 may also include a security module 130 configured to collect information as to which applications of the computing device 100 are accessing the data on the user's behavior when the user is interacting with the groups of elements of the graphical interface 115 for performing transactions with the remote bank server 150. For this, the security module 130 may log the calls of system functions (saves information on which application's process is calling up these functions) which are responsible for access to the data on the user's behavior (for example, the "SetCursorPos" function). In one exemplary aspect, the security module 130 includes an OS core level driver, by which the module 130 intercepts the calls of functions for access to data on the user's behavior.

In one exemplary aspect, upon change in the position of the cursor (for a "mouse" type manipulator), the interrupt handler of the "mouse" device calls up the cursor coordinate change function (for example, "SetCursorPos"), which cursor consequently changes its position on the screen of the computing device 100; the security module 130, including a driver embedded in the stack of drivers which process requests from the interrupt handler, then receives information as to which process is changing the coordinates of the cursor (e.g., either the driver of a real "mouse" device or a certain application, such as a malicious application).

In one exemplary aspect, the security module 130 may be an antivirus software.

In yet another aspect, the information gathered by the security module 130 may be stored in a database which is part of the module 130.

After gathering data on the user's behavior, the behavior determination module 120 may relays this data, along with information as to during which interaction with which groups of graphical elements of the user's interface 115 of the device 100 said data was collected, to a behavior classification module 160. In yet another exemplary aspect, the behavior determination module 120 transmits the aforementioned information to the module 160 only after data is gathered on the user's behavior when interacting with a specified set of groups of elements of the graphical interface (for example, with at least 5 groups).

It should be noted that before transmitting the data on the user's behavior gathered by the module 120, this data may undergo processing by the module 120: for example, the group of coordinates of the cursor is transformed into a trajectory of movement of the cursor, while the group of coordinates of the points of pressing the touchscreen and releasing is transformed into a trajectory of movement of a finger across the screen (a swipe). In one exemplary aspect, the data on the user's behavior is collected by the module 120 during a specified interval of time (such as 5 minutes or 24 hours), and then this data is transmitted to the behavior classification module 160. In yet another exemplary aspect, the data on the user's behavior may be collected during the interaction of the user with a separate group of elements of the graphical interface 115: the behavior data will be sent by the module 120 to the module 160 if, for example, the user moves the cursor from one group of elements of the graphical interface 115 to another group of elements, or if the user goes from one web page which constitutes as a whole a group of elements of the graphical interface to another page.

In yet another exemplary aspect, the module 120 performs processing of the collected data as follows: for movements of the mouse cursor (which are determined by the set of points through which the cursor moves) the displacement vector is calculated (for example, between end point and starting point of the cursor position), the rate of movement and the acceleration at each point of the cursor, and also the angular velocity and angular acceleration (calculated for displacement of the cursor from one point of movement to the next with respect to the starting point of movement).

In one exemplary aspect, the behavior determination module 120 may perform a "depersonalization" of the collected data (for example, to avoid violation of privacy rights of the user of the device 100 for collection of personal data, and also to prevent the transmission of a large volume of data)—the data collected on the user's behavior can be subjected to processing, for example, using a hash function (such as MD5, SHA-0 or SHA-1 and so on). Thus, the module 160 will be sent not "raw" data on the user's behavior, but hash sums which will with high probability (limited only by the probability of occurrence of collision) uniquely identify the data on the behavior of the user of the device 100, and by using the aforementioned hash sums it will not be possible to reconstruct the data from which the respective hash sums were calculated. In one exemplary aspect, all the data collected on the behavior of the user of the device 100 is subjected to such processing. In yet another exemplary aspect, only data including photographs and video clips taken by a camera and sound recordings in digital format may be subjected to such processing.

In one exemplary aspect, the behavior classification module 160 is configured to calculate the anomalous user behavior coefficient for each group of elements of the graphical interface, during the interaction with which group data on the user's behavior was gathered by the behavior determination module 120. The anomalous user behavior coefficient is a number, such as one from 0 to 100 (in yet another aspect, any other real number) which shows to what extent the user's behavior (according to the data gathered on the behavior) is uncharacteristic of the owner of the device (or the account record for interaction with the remote bank server). The larger this number, the less characteristic of this user is the behavior on which data was collected during the interaction of the user and the remote bank server 150. In one exemplary aspect, the value 0 of the anomaly coefficient may mean that the user's behavior on which data was collected during the interaction of the user with a certain group of graphical elements conforms entirely to the user of the device 100.

In order to calculate the anomalous user behavior coefficient, the classification module 160 uses a classification algorithm, such as the naive Bayes classifier or the like. The input data for such an algorithm is the data on the user's behavior during the interaction of the user with a group of elements of the graphical interface 115. The result of such an algorithm is a number which is taken to be the anomalous user behavior coefficient.

In order for the behavior classification module 160 to be able to calculate the anomalous user behavior coefficient, the classification algorithm used first undergoes a learning stage. During the learning stage, the algorithm is presented with known data (examples of such data will be given below) as to the behavior of the user of the computing device 100 during the interaction of the user with different groups of elements of the graphical interface 115, and also known information on whether such interaction is fraudulent activity (in the event that someone else is using the device 100). The information used for the learning, in one exemplary aspect, may be stored in a database 165. In addition to the fact that the use of such an algorithm enables distinguishment of the behavior of one user from another when using the same device 100, this algorithm will also make it possible to recognize situations where the behavior of the user is being imitated by software: the trajectory of movement of the cursor during such an imitation is more reminiscent of a straight line, the data input using the elements of the graphical interface for input of text will generally not be accompanied by pressing a key to delete the last character entered, when the device 100 is being used by the user the acceleration sensor generally indicates that the device is not motionless, the illumination sensor also generally indicates that the user is not using the device 100 in total darkness, and when the device 100 is being used by a real user the microphone may record certain sounds (for example, caused by the movement of the user) which is not characteristic of a situation with software imitation of the user's behavior.

In one exemplary aspect, to teach of the classification algorithm the known data on the behavior of the user of the computing device 100 during the interaction with the remote bank server 150 (specifically with groups of elements of the graphical interface 115 for the interaction with the remote bank server 150) is collected continuously by the behavior determination module 120 and transmitted to the behavior classification module 160, which saves this information in the database 165. The collected data are a priori considered to correspond to non-fraudulent activity (interaction with the remote server 150 during which the data on the user's behavior was collected is not considered to be fraudulent activity) until such time as the contrary is detected (proven) in the context of at least one of the methods of realization of the present invention, or a bank employee himself indicates periods of fraudulent activity with the user's device 100, thereby indicating instances of fraudulent activities corresponding to the data collected on the behavior of the user when interacting with the groups of elements of the graphical interface 115. In one exemplary aspect, one uses data on the user's behavior to teach the classification algorithm, said data having been collected during a specified interval of time (for example, one month or one year). In one exemplary aspect, one selects for the teaching an interval of time of given length (for example, one month, as indicated above) which ends not later than a certain amount of time prior to the instant of teaching the classification algorithm (such as one month)—this kind of a "delay" in the teaching is useful in situations where the bank employee can discover fraudulent activity in the indicated period of time (between the end of the collection of data on the user's behavior and the start of the teaching of the algorithm) and make the corresponding changes to the data stored in the database 165.

Figure 2:
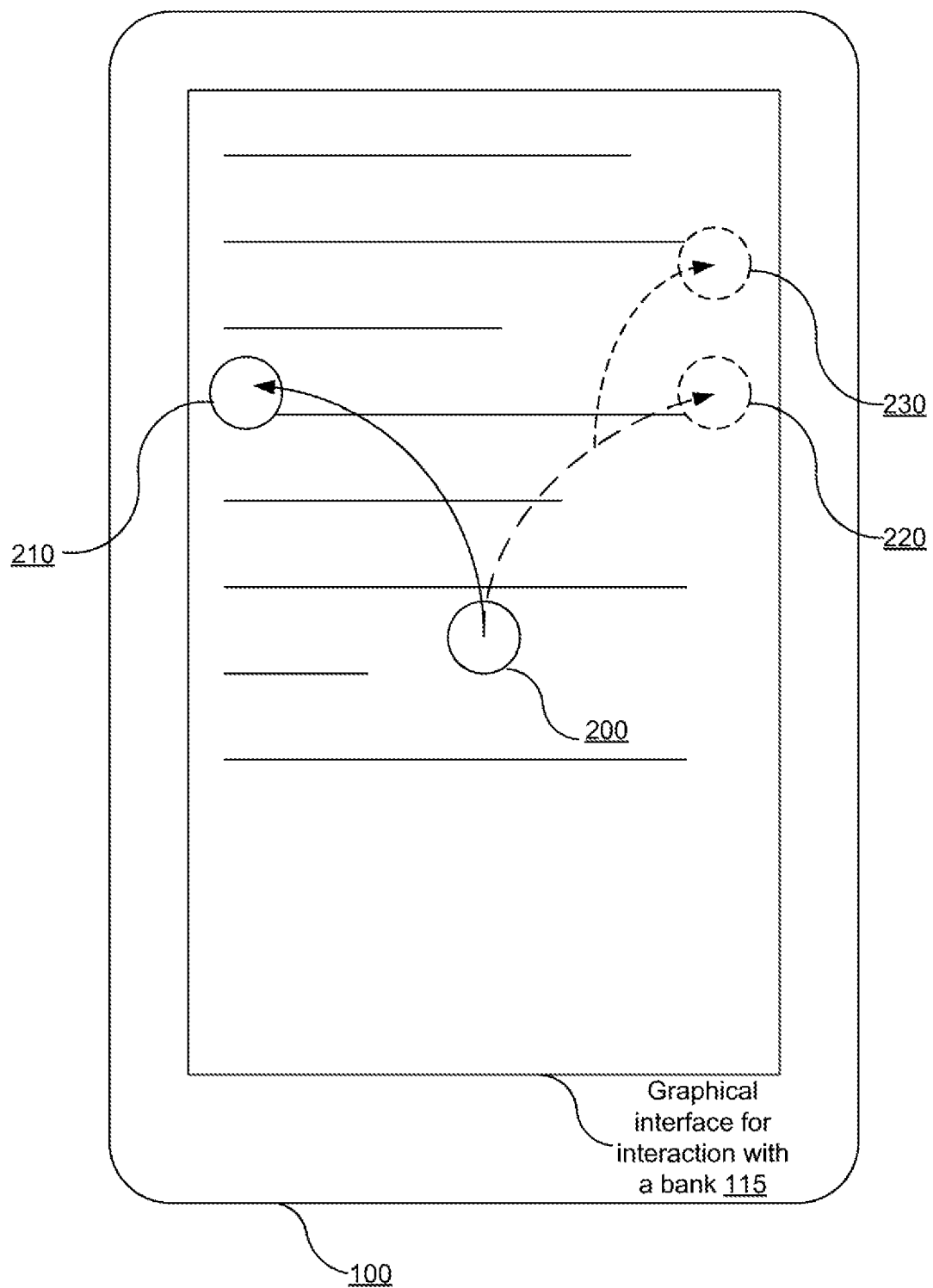
FIG. 2 illustrates an example of the interaction of a user with elements of an application graphical interface.

An example operation of the behavior classification module 160 will be provided next with reference to FIG. 2. FIG. 2 depicts a computing device 100 (in the given instance, a smartphone), where the data on the user's behavior include at least the coordinates of the point of pressing/releasing the touchscreen of the device 100. During the interaction of the user with a group of elements of the graphical interface 115 (in the given instance, all the elements of the graphical interface displayed to the user) of the application 110 during the interaction with the remote bank server 150, the following information has been gathered using the module 120: pressing (the coordinates of points) the screen at the point 200 and at all other points lying on the trajectory of movement of a finger up to the release point 210. This information (along with an indication of which group of displayed graphical elements of the interface 115 this information corresponds to) is sent by the module 120 to the behavior classification module 160. The module 160 on the basis of the data obtained determines to what extent that movement, characterized by the displacement of the finger over the touchscreen from point 200 to point 210 is uncharacteristic of the user of the device 100—the user on whose behavior during interaction with different groups of the graphical interface 115 the data was previously collected to teach the classification algorithm of the module 160. During the algorithm teaching phase, the behavior classification module 160 utilized data on the user's behavior, which data included information on the movement of the user's finger across the touchscreen of the computing device 100 along a trajectory from point 200 to point 220. In the given case, the behavior classification module 160 will calculate the anomalous user behavior coefficient for the aforesaid group of elements of the graphical interface, the value of the coefficient being large, for example 90 or in one exemplary aspect even 100 (applies to a situation where the trajectories of movement from 200 to 210 and from 200 to 220 have no points of intersection). If the behavior determination module 120 had been presented with data on the user's behavior that includes information on the coordinates of the points of pressing the screen, corresponding to the movement of the finger across the screen along a trajectory from point 200 to point 230 (this trajectory coincides partly with the trajectory of movement between points 200 and 220), the behavior classification module 160 would have calculated an anomalous user behavior coefficient whose value was smaller than in the previous example, such as 22.

In one exemplary aspect, the database 165 stores the data on the user's behavior that was collected from all the user's devices 100. This data is used in teaching the classification algorithm by the module 160. In yet another aspect, the database 165 will contain individual sets of data on the user's behavior corresponding to each individual device 100. For teaching the classification algorithm to be used for the data on the user's behavior on a certain device 100, it is possible to use a set of data on the user's behavior corresponding to both the mentioned device 100 as well as any other set of data on the behavior or a combination of such sets. Such a partition of the data collected on the user's behavior into groups corresponding to the devices 100 of the user is effective for teaching the classification algorithm in a case where the user's behavior when using different devices 100 is highly different (for example, when using a tablet and a desktop computer).

In yet another exemplary aspect, the behavior classification module 160 may calculate the anomaly coefficient using a support vector algorithm (support vector machine—SVM). The learning stage of the SVM algorithm is similar to that described above.

In yet another exemplary aspect, the behavior classification module 160 may calculate the anomaly coefficient using any other classification algorithm for which learning with a teacher is employed. The learning stage of such an algorithm is similar to that described above.

The behavior classification module 160 calculates the anomalous user behavior coefficient for each group of elements of the graphical interface 115 for which the behavior determination module 120 has gathered and relayed data on the user's behavior during the interaction of the user with the aforementioned groups of elements of the graphical interface 115. At least one calculated anomalous user behavior coefficient is sent by the module 160 to a decision making module 170.

In one exemplary aspect, the decision making module 170 is configured to detect fraudulent activity during the interaction of the user (via the computing device 100) with the remote bank server 150 if the combination of anomalous user behavior coefficients as calculated in the previous step exceeds an established threshold value. When calculating the combination of the anomalous user behavior coefficients, the following information is used, being stored in the database 165:

for the group of elements of the graphical interface—the number of times the users access (interact with) the aforementioned group of elements of the graphical interface. This information in the database 165 can be altered by the module 160 as data arrives from the module 120 at the module 160, i.e., the more data on the behavior of the user when interacting with a certain group of graphical elements arrives at the module 160, the greater the number times the users access the individual group of elements of the graphical interface will be saved in the database 165 by the module 160. The mentioned parameter—the number of times the users access the mentioned group of elements—can be the average number of times the users access the mentioned group of elements in 24 hours;

for the group of elements of the graphical interface—the number of groups of elements of the graphical interface by interacting with which the user can obtain access to the aforementioned group of elements of the graphical interface, for example, the number of buttons making up the various groups of elements of the graphical interface, upon pressing which buttons the user of the device 100 will be presented with a certain (the aforementioned "separate") group of elements of the graphical interface. This information can be added to the database 165 by the interface developer for interaction with the remote bank server 150;

for the group of elements of the graphical interface—the number of elementary actions of the user needed to carry out a transaction with the use of a remote bank server, provided the user is interacting with the aforementioned group of elements of the graphical interface—for example, the number of "clicks" (pressing of the buttons of the "mouse" manipulator) on different buttons of the graphical interface 115 which the user needs in a situation of interacting with a certain group of the graphical interface 115 (for example, this group of elements is displayed to the user: input field, button, and field containing text information) to carry out a transaction (involving funds)—such as the number of elementary actions which the user needs to perform to visit a certain number of web pages in succession (in the event that the application 110 is a web browser), while on the last web page there will be displayed the elements of the graphical interface (such as a button) by interacting with which the user will be able to send the bank a command to perform a certain action involving funds (for example, pay a fine by means of these funds);

the number of known cases of fraudulent activity carried out on behalf of the user in an established period of time. In one exemplary aspect, the module 170 saves information on detected cases of fraudulent activity being carried out using the user's device 100. In yet another exemplary aspect, this information is saved in the database 165 by a bank employee having access to the corresponding information.

It should be noted that the above-mentioned information can be saved in the database 165 by a bank employee.

If the decision making module 170 has received from the behavior classification module 160 only one anomalous user behavior coefficient, upon detection of fraudulent activity by the decision making module 170 only this one coefficient is used, taking into account the above-described information to be used in calculating the combination of anomalous user behavior coefficients. The module 170 calculates a certain value (combination of anomalous user behavior coefficients) using a mathematical function, one of the input parameters of which is the set of anomalous user behavior coefficients. This set may consist of one or more elements. In one exemplary aspect, the following formula is used to calculate the combination of anomalous user behavior coefficients by the module 170:

$$K = \frac{\sum_{i=1}^{n} \sqrt[d_i/f]{k_i + p_i * r_i}}{n},$$

where K is the combination of anomalous user behavior coefficients; n is the number of anomalous user behavior coefficients (and, accordingly, groups of elements of the graphical interface 115 on the basis of which the coefficients are calculated) on the basis of which said combination is calculated; $k_i$ is the i-th anomalous user behavior coefficient, calculated for the i-th group of elements of the graphical interface 115; $p_i$ is the number of times the users access the i-th separate group of elements of the graphical interface; $r_i$ is the number of groups of elements of the graphical interface by interacting with which the user can gain access to the i-th group of elements of the graphical interface; $d_i$ is the number of elementary actions of the user needed to carry out a transaction using a remote bank server, provided that the user is interacting with the i-th group of elements of the graphical interface; f is the number of known cases of fraudulent activity carried out on behalf of the user in a given period of time.

In one exemplary aspect, other formulas may be used to calculate the combination of anomalous user behavior coefficients whereby the combination of anomalous user behavior coefficients is directly proportional to the following values (or at least some of the following values): f, $k_i$, $p_i$, $r_i$, and inversely proportional to the following values: $d_i$, (provided that these values are present in the formula). The definitions of the above designations have been given above.

If the combination of anomalous user behavior coefficients exceeds an established (threshold) value (such as "70"), the decision making module 170 detects fraudulent activity in the interaction of the user via the device 100 with a remote bank server 150. But if the combination of anomalous user behavior coefficients does not exceed the established value, the analysis continues in regard to new data being gathered by the module 120.

In one exemplary aspect, the detection of fraudulent activity by the decision making module 170 is done not by comparing the combination of anomaly coefficients with an established threshold value, but using a heuristic rule, in which a decision is made on the basis of the above-described information used in the formula (including the values of all the calculated anomaly coefficients). In one exemplary aspect, this rule may look like one of the following: if, among the anomalous user behavior coefficients, there is a coefficient which exceeds an established threshold value (such as 90), fraudulent activity is detected; if, among the anomalous user behavior coefficients, there is a coefficient for which: ki*pi*ri>90, fraudulent activity is detected.

In yet another exemplary aspect, the decision making module 170 may detect fraudulent activity using another heuristic rule whereby the larger the following values: f, $k_i$, $p_i$, $r_i$ (defined above), and the smaller the following values: $d_i$ (defined above), the more likely it is that the module 170 will detect fraudulent activity.

It should be understood that the numbers used in the above description are only examples and different values may be use in other configurations and aspects of the invention.

In one exemplary aspect, the decision making module 170 may block the interaction of the user via the computing device 100 with the remote bank server 150 if fraudulent activity has been detected in the interaction of the user's device 100 with the remote bank server 150 (or, put more simply, in the interaction of the user with the remote bank server).

In yet another exemplary aspect, upon detecting fraudulent activity the decision making module 170 may notify the bank employee via, e.g., email or SMS message (the contact data of the corresponding employee can be stored in the database 165), and halts the interaction of the user via the computing device 100 with the remote bank server 150 for a given interval of time (such as 6 hours), which can be utilized so that said bank employee has time to contact the user on behalf of whom the fraudulent activity was carried out.

In yet another exemplary aspect, if fraudulent activity has been detected in the interaction of the user's device 100 with a remote bank server 150, the decision making module 170 sends a corresponding alert to the security module 130. In one exemplary aspect, the module 160 sends to the module 170 not only the calculated anomalous user behavior coefficients for each group of elements of the graphical interface, but also the actual data on the user's behavior received from the module 120 and used to calculate the aforesaid coefficients. In turn, the decision making module 170, if fraudulent activity has been detected, will send to the security module 130 information containing the data on the user's behavior, which data was used to calculate the anomalous user behavior coefficients.

In one exemplary aspect, the security module 130, using the data received on the user's behavior, determines which applications carried out the access to the data on the user's behavior during the user's interaction with the groups of elements of the graphical interface 115 of the application 110 (the corresponding information is saved by the security module 130 during the interaction of the user and the application 110). The security module 130 recognizes the application on the computing device 100 to be malicious if fraudulent activity was detected during the interaction of the user's device 100 with a remote bank server 150 (a corresponding alert was received from the module 170), and the mentioned application accessed the data on the user's behavior during the user's interaction with at least one group of elements of the graphical interface 115 for interaction with the remote bank server 150, for which group data has been gathered on the user's behavior by the module 120.

In yet another exemplary aspect, the module 170 sends to the module 130 only that data on the user's behavior (which will be used afterwards to find the application accessing the data on the user's behavior during the interaction of the user's device 100 with the remote bank server 150) which corresponds to a given number of the largest (for example, the two largest) anomalous user behavior coefficients among those calculated by the behavior classification module 160.

In yet another exemplary aspect, the module 170 can alert the user of the device 100, for example via a message dispatched by email or an SMS communication (where the contact data of the user for such a notification can be kept in the database 165), that fraudulent activity has been detected which is being carried out on behalf of the user: with the use of the computing device 100 of the user or with the use of the account record for interaction with the remote bank server 150.

Figure 3:
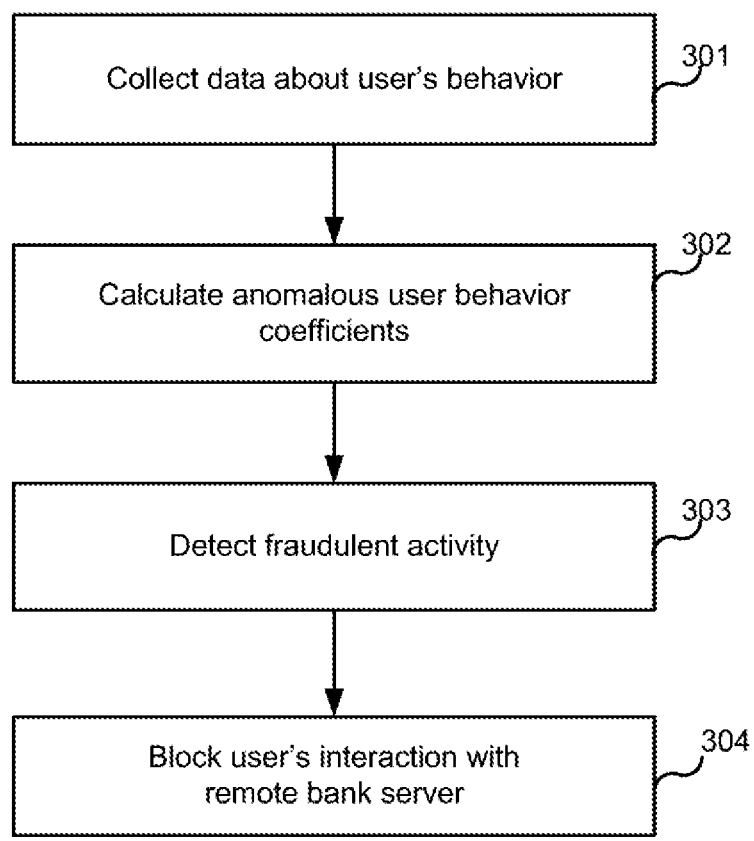
FIG. 3 shows a flow diagram of an exemplary method for detecting fraudulent user transactions.

FIG. 3 shows a flow diagram of an exemplary method for detecting fraudulent user transactions. In step 301, the behavior determination module 120 collects data on the user's behavior during the user's interaction with at least one group of elements of the graphical interface 115 of the application 110, which data is used for the interaction with the remote bank server 150. The data gathered is sent by the module 120 to the module 160. The goal of the interaction with the remote bank server 150 is to carry out a transaction with the participation of the remote server 150 (for example, involving the funds of the user of the computing device 100). For each group of elements of the graphical interface 115, a separate set of data is collected as to the user's behavior. The data on the user's behavior is information obtained using at least the input device of the computing device 100.

In one exemplary aspect, in addition the security module 130 gathers information on which applications of the computing device 100 are accessing the data on the user's behavior during the user's interaction with each group of elements of the graphical interface 115 of the application 110 for the interaction with the remote bank server 150, for which group data on the user's behavior is gathered in step 301.

In step 302, the behavior classification module 160 calculates the anomalous user behavior coefficient for each group of elements of the graphical interface for which data was gathered in step 301 as to the user's behavior during interaction with said group. The anomalous user behavior coefficient is a numerical value, which is larger as the behavior is less characteristic of said user, for which behavior the data was gathered in step 301. In calculating the anomaly coefficient, a naive Bayes classifier may be applied to the data on the user's behavior during the interaction with a group of elements of the graphical interface. The calculated anomalous user behavior coefficients are sent by the module 160 to the module 170.

In step 303, fraudulent activity is detected using the decision making module 170 in the interaction of the user's device 100 with a remote bank server 150 if the combination of anomalous user behavior coefficients calculated in step 302 exceeds an established threshold value. When calculating the combination of anomalous user behavior coefficients, the following information stored in the database 165 is used: for the group of elements of the graphical interface—the number of times the users access an individual group of elements of the graphical interface; for the group of elements of the graphical interface—the number of groups of elements of the graphical interface by interacting with which the user can obtain access to the aforementioned group of elements of the graphical interface; for the group of elements of the graphical interface—the number of elementary actions of the user needed to carry out a transaction with the use of a remote bank server, provided the user is interacting with the aforementioned group of elements of the graphical interface; the number of known cases of fraudulent activity carried out on behalf of the user in an established period of time.

An elementary action may include, but not limited to: movement of the mouse cursor, pressing a key of the input device, moving of a person's finger or a stylus across the screen of the computing device 100 without lifting off from the screen surface, touching of a person's finger or the stylus to the screen of the computing device 100. Fraudulent activity may include, but not limited to an interaction with the remote bank server 150 which is carried out with the use of the user's device 100 or of the account record for the performance of said interaction belonging to the user, and unbeknownst to the user. Information on known cases of fraudulent activity are stored in the database 165 on the remote bank server 150.

In step 304, the decision making module 170 blocks the interaction of the user (which the user is carrying out via the computing device 100) with a remote bank server 150 if fraudulent activity has been detected during the interaction of the user's device 100 with the remote bank server 150 in step 303.

In yet another exemplary aspect, in addition an application on the computing device 100 is considered to be malicious by the security module 130 if fraudulent activity was discovered in step 303 during the interaction of the user's device 100 with the remote bank server 150, and the mentioned application has accessed the data on the user's behavior during the user's interaction with at least one group of elements of the graphical interface 115 of the application 110 for interaction with the remote bank server 150, for which group data has been gathered on the user's behavior.

Figure 4:
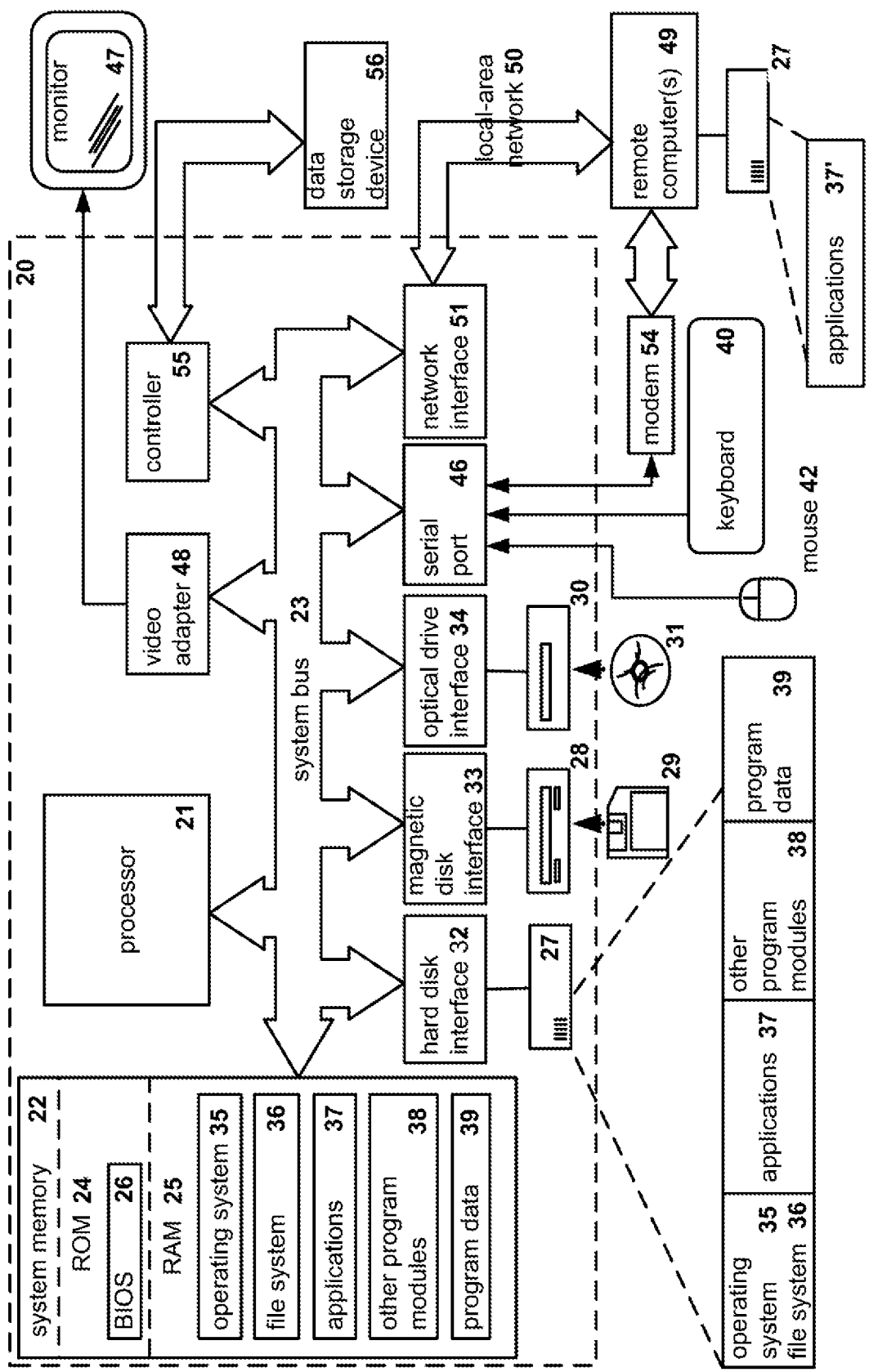
FIG. 4 illustrates an example of a general-purpose computer system on which the disclosed system and method can be implemented according to an example aspect.

FIG. 4 illustrates an example of a general-purpose computer system (which may be a personal computer or a server) on which the disclosed systems and method can be implemented according to an example aspect. As shown, the computer system includes a central processing unit 21, a system memory 22 and a system bus 23 connecting the various system components, including the memory associated with the central processing unit 21. The system bus 23 is realized like any bus structure known from the prior art, containing in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, using a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate in a network environment, using a network connection to one or more remote computers 49. The remote computer (or computers) 49 are also personal computers or servers having the majority or all of the aforementioned elements in describing the nature of a personal computer 20, as shown in FIG. 3. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 3 above). Accordingly, each module can be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine under-taking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the concepts disclosed herein.

What is claimed is:

1. A method for detecting software-imitated user interactions, the method comprising:
    gathering, by a hardware processor, user behavior data from an input device specifying a user interaction with graphical user interface (GUI) elements of a first application on a computing device for a transaction with a remote server;
    training, by the hardware processor, a probabilistic behavior classifier using previously gathered user behavior data and using information indicating whether a particular instance of a user interaction with the GUI elements within the previously gathered data comprises fraudulent behavior;
    calculating, by the hardware processor, based on the user behavior data, a number of interface actions of the user needed to complete the transaction, including one or more of a moving a mouse cursor, pressing a key of the input device, moving of a user's finger or a stylus across a screen of the computing device without lifting off from the screen, and touching of a user's finger or the stylus to the screen of the computing device;
    calculating, by the hardware processor, an anomalous user behavior coefficient, based on the user behavior data and the probabilistic behavior classifier, wherein the anomalous user behavior coefficient represents a likelihood that the user's interaction with a GUI element of the GUI elements of the first application was fraudulent and wherein the anomalous user behavior coefficient is inversely proportional to the calculated number of interface actions of the user needed to complete the transaction;
    detecting, by the hardware processor, whether the user interaction is a software-imitated user interaction based on the anomalous user behavior coefficient; and
    responsive to detecting a software-imitated user interaction, blocking, by the hardware processor, the transaction with the remote server.

2. The method of claim 1, wherein calculating the anomalous user behavior coefficient based on the user behavior data and the behavior classifier further comprises:
    calculating, based on the user behavior data, a number of times users have accessed the GUI elements of the first application.

3. The method of claim 1, wherein calculating the anomalous user behavior coefficient based on the user behavior data and the probabilistic behavior classifier further comprises:
    calculating, based on the user behavior data, a number of groups of other GUI elements by interacting with which the user can obtain access to the GUI elements.

4. The method of claim 1, wherein the user behavior data further comprises a group of coordinates associated with movement of the input device, and wherein the anomalous user behavior coefficient indicates a degree to which the movement of the input device is uncharacteristic of the user of the computing device based on the behavior classifier previously trained using the known behavior of the user including previous movements of the input device.

5. The method of claim 1, wherein the probabilistic behavior classifier comprises a naive Bayes classifier configured to calculate the anomalous user behavior coefficient as a numerical value indicating how uncharacteristic of the user the received user behavior data is.

6. The method of claim 1, wherein the detecting whether the user interaction is a software-imitated user interaction is further based on a heuristic rule specifying the larger the set of values including the anomalous user behavior coefficient, a number of times users access the GUI elements; a number of groups of GUI elements by interacting with which the user can gain access to the GUI elements, and the smaller the number of elementary actions of the user needed to carry out a transaction with the remote server, provided that the user is interacting with the one or more GUI elements, the more likely the user interaction is a software-imitated user interaction.

7. A computing device for detecting software-imitated user interactions, the computing device comprising: an input device configured to provide user behavior data specifying a user interaction with one or more graphical user interface (GUI) elements of a first application on the computing device for a transaction with a remote server; and a hardware processor configured to:
    receive gather the user behavior data;
    train a probabilistic behavior classifier using previously gathered user behavior data and using information indicating whether a particular instance of a user interaction with the GUI elements within the previously gathered data comprises fraudulent behavior;
    calculate, based on the user behavior data, a number of interface actions of the user needed to complete the transaction, including one or more of a moving a mouse cursor, pressing a key of the input device, moving of a user's finger or a stylus across a screen of the computing device without lifting off from the screen, and touching of a user's finger or the stylus to the screen of the computing device;
    calculate an anomalous user behavior coefficient, based on the user behavior data and the probabilistic behavior classifier, wherein the anomalous user behavior coefficient represents a likelihood that the user's interaction with a GUI element of the GUI elements of the first application was fraudulent and wherein the anomalous user behavior coefficient is inversely proportional to the calculated number of interface actions of the user needed to complete the transaction;
    detect whether the user interaction is a software-imitated user interaction based on a comparison of the anomalous user behavior coefficient with a predetermined threshold value; and
    responsive to detecting a software-imitated user interaction, block the transaction with the remote server.

8. The computing device of claim 7, wherein the processor configured to calculate the anomalous user behavior coefficient based on the user behavior data and the behavior classifier is further configured to:

calculate, based on the user behavior data, a number of times users have accessed the GUI elements of the first application.

9. The computing device of claim 7, wherein the processor is configured to calculate the anomalous user behavior coefficient based on the user behavior data and the probabilistic behavior classifier is further configured to:

calculate, based on the user behavior data, a number of groups of other GUI elements by interacting with which the user can obtain access to the GUI elements.

10. The computing device of claim 7, wherein the user behavior data further comprises a group of coordinates associated with movement of the input device, and wherein the anomalous user behavior coefficient indicates a degree to which the movement of the input device is uncharacteristic of the user of the computing device based on the behavior classifier previously trained using the known behavior of the user including previous movements of the input device.

11. The computing device of claim 7, wherein the probabilistic behavior classifier comprises a naive Bayes classifier configured to calculate the anomalous user behavior coefficient as a numerical value indicating how uncharacteristic of the user the received user behavior data is.

12. The computing device of claim 7, wherein the detecting whether the user interaction is a software-imitated user interaction is further based on a heuristic rule specifying the larger the set of values including the anomalous user behavior coefficient, a number of times users access the GUI elements; a number of groups of GUI elements by interacting with which the user can gain access to the GUI elements, and the smaller the number of elementary actions of the user needed to carry out a transaction with the remote server, provided that the user is interacting with the one or more GUI elements, the more likely the user interaction is a software-imitated user interaction.

13. A non-transitory computer readable medium comprising computer executable instructions for detecting software-imitated user interactions, including instructions for:

gathering, by a hardware processor, user behavior data from an input device specifying a user interaction with graphical user interface (GUI) elements of a first application on a computing device for a transaction with a remote server;

training, by the hardware processor, a probabilistic behavior classifier using previously gathered user behavior data and using information indicating whether a particular instance of a user interaction with the GUI elements within the previously gathered data comprises fraudulent behavior;

calculating, by the hardware processor, based on the user behavior data, a number of interface actions of the user needed to complete the transaction; including one or more of; a moving a mouse cursor, pressing a key of the input device, moving of a user's finger or a stylus across a screen of the computing device without lifting off from the screen, and touching of a user's finger or the stylus to the screen of the computing device;

calculating, by the hardware processor, an anomalous user behavior coefficient, based on the user behavior data and the probabilistic behavior classifier, wherein the anomalous user behavior coefficient represents a likelihood that the user's interaction with a GUI element of the GUI elements of the first application was fraudulent and wherein the anomalous user behavior coefficient is inversely proportional to the calculated number of interface actions of the user needed to complete the transaction;

detecting, by the hardware processor, whether the user interaction is a software-imitated user interaction based on a comparison of the anomalous user behavior coefficient with a predetermined threshold value; and responsive to detecting a software-imitated user interaction, blocking, by the hardware processor, the transaction with the remote server.

14. The non-transitory computer readable medium of claim 13, wherein the instructions for calculating the anomalous user behavior coefficient based on the user behavior data and the behavior classifier further comprises instructions for:

calculating, based on the user behavior data, a number of times users have accessed the GUI elements of the first application.

15. The non-transitory computer readable medium of claim 13, wherein calculating the anomalous user behavior coefficient based on the user behavior data and the probabilistic behavior classifier further comprises:

calculating, based on the user behavior data, a number of groups of other GUI elements by interacting with which the user can obtain access to the GUI elements.

16. The non-transitory computer readable medium of claim 13, wherein the user behavior data further comprises a group of coordinates associated with movement of the input device, and wherein the anomalous user behavior coefficient indicates a degree to which the movement of the input device is uncharacteristic of the user of the computing device based on the behavior classifier previously trained using the known behavior of the user including previous movements of the input device.

17. The non-transitory computer readable medium of claim 13, wherein the probabilistic behavior classifier comprises a naive Bayes classifier configured to calculate the anomalous user behavior coefficient as a numerical value indicating how uncharacteristic of the user the received user behavior data is.

18. The non-transitory computer readable medium of claim 13, wherein the detecting whether the user interaction is a software-imitated user interaction is further based on a heuristic rule specifying the larger the set of values including the anomalous user behavior coefficient, a number of times users access the GUI elements; a number of groups of GUI elements by interacting with which the user can gain access to the GUI elements, and a smaller a number of elementary actions of the user needed to carry out a transaction with the remote server, provided that the user is interacting with the one or more GUI elements, the more likely the user interaction is a software-imitated user interaction.

* * * * *